(12) United States Patent
Fan et al.

(10) Patent No.: US 9,998,505 B2
(45) Date of Patent: Jun. 12, 2018

(54) METHOD AND DEVICE FOR CALL PLAYBACK IN RINGING STATE

(71) Applicant: ZTE Corporation, Shenzhen (CN)

(72) Inventors: Ke Fan, Shenzhen (CN); Jinning He, Shenzhen (CN); Qiang Tu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 128 days.

(21) Appl. No.: 15/111,064

(22) PCT Filed: Jul. 15, 2014

(86) PCT No.: PCT/CN2014/083085
§ 371 (c)(1),
(2) Date: Jul. 12, 2016

(87) PCT Pub. No.: WO2015/117295
PCT Pub. Date: Aug. 13, 2015

(65) Prior Publication Data
US 2016/0337414 A1 Nov. 17, 2016

(30) Foreign Application Priority Data
Feb. 8, 2014 (CN) .......................... 2014 1 0045849

(51) Int. Cl.
*H04L 29/06* (2006.01)
(52) U.S. Cl.
CPC ...... *H04L 65/1096* (2013.01); *H04L 65/1006* (2013.01); *H04L 65/1069* (2013.01)
(58) Field of Classification Search
None
See application file for complete search history.

(56) References Cited

U.S. PATENT DOCUMENTS 9,300,696 B2 * 3/2016 Kim .................... H04L 65/1069
2011/0047131 A1 * 2/2011 Huang .............. G06F 17/30029
707/694

(Continued)

FOREIGN PATENT DOCUMENTS

CN     102036319 A     4/2011
CN     102244911 A    11/2011
(Continued)

OTHER PUBLICATIONS

International Search Report for corresponding application No. PCT/CN2014/083085 filed on Jul. 25, 2014; dated Nov. 18, 2014.

*Primary Examiner* — Anh Ngoc M Nguyen
(74) *Attorney, Agent, or Firm* — Cantor Colburn LLP (57) ABSTRACT

The disclosure discloses a method and device for call playback in a ringing state. The method includes that: after forwarding a call request initiated by a user terminal, and when receiving a first temporary response message returned by a called party, an Access Transfer Control Functionality (ATCF) applies for a media resource for a first playback media and performs playback on the first playback media, wherein the first temporary response message carries description information about the first playback media; when receiving an nth temporary response message of the call request, the ATCF reapplies for a pair of media resources to anchor an nth playback media, wherein the nth temporary response message carries description information about the nth playback media, and n is a natural number which is greater than or equal to 2; and the ATCF performs playback on the nth playback media through the pair of media resource.

19 Claims, 5 Drawing Sheets

(56) References Cited

U.S. PATENT DOCUMENTS

2013/0028179 A1* 1/2013 Sedlacek ............ H04L 65/1016
370/328
2014/0328323 A1* 11/2014 Zhang ..................... H04L 69/24
370/331

FOREIGN PATENT DOCUMENTS

| CN | 103457935 A | 12/2013 |
|---|---|---|
| WO | 2014008913 A1 | 1/2014 |

* cited by examiner

METHOD AND DEVICE FOR CALL PLAYBACK IN RINGING STATE

TECHNICAL FIELD

The disclosure relates to the technical field of communications, and in particular to a method and device for call playback in a ringing state

BACKGROUND

Figure 1:
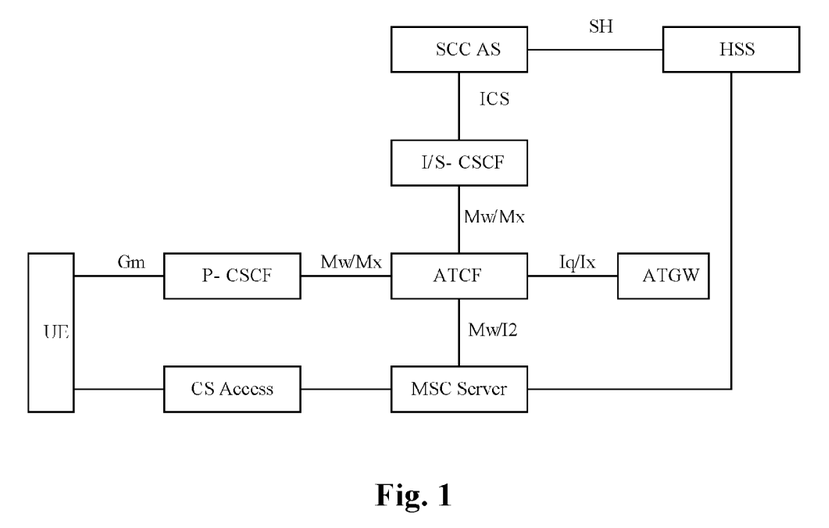
FIG. 1 is a network structural schematic diagram of an IMS system in the related art.

An IP Multimedia Subsystem (IMS) is a new multimedia service form, which can meet requirements of terminal customers for more innovative and diverse multimedia services. FIG. 1 is a network structural schematic diagram of an IMS system in the related art. All functions in FIG. 1 are described below.

A Call Session Control Function (CSCF) is a core function entity of the IMS system and primarily responsible for processing signal controlling in a process of multimedia call session. The CSCF manages user authentication of an IMS network and QoS of an IMS bearing plane, and cooperates with other network entities to control a Session Initiation Protocol (SIP) session and perform service negotiation and resource allocation. In the FIG. 1, the CSCF includes a Proxy CSCF (P-CSCF) and a Serving CSCF (S-CSCF).

The P-CSCF is a unified entry point for the IMS to access a network. All session messages which are initiated by an IMS terminal and end in the IMS terminal are sent to other network elements of a network side through the P-CSCF.

The S-CSCF is a core of the IMS and locates in a home network. The SCSCF implements a registration function and session control of an User Equipment (UE).

An Access Transfer Gateway (ATGW) is an anchoring point of calling, by a VoIP, user media.

In the IMS network, an Access Transfer Control Functionality (ATCF) system mainly functions in supporting a VoIP call accessing by PS, receiving a switching request from an MSC Server during the call, switching the call to a CS network, and keeping call continuous during a switching process.

If the ATCF sends an invite request and receives multiple response messages (including 18×, 200 responses) corresponding to the invite request, wherein tag field values in To headers of these response messages are different (each to-tag represents a different call leg), then it is considered that this is a Forked call. For an application scenario of the ATCF, usually the S-CSCF has a fork, receives multiple response messages of a called side and transparently passes them to the ATCF, which causes the Forked call to appear in the ATCF.

According to a 3GPP 24.229 requirement, an IMS network element needs to support multiple response messages transparently passing the Forked call and a final call of the Forked call. But 3GPP 24.237 does not describe media anchoring and playback flow of the Forked call in a ringing state of the ATCF. For the Forked call in the ringing state, if the multiple response messages (having different to-tags) of the called side carry different playback media information, anchoring media resources in an usual way can only anchor the media in a certain response, then a simultaneous playbacks of multiple Forked calls in the ringing state cannot be implemented.

SUMMARY

For solving the problem that it is impossible to simultaneously perform playback on multiple Forked calls in a ringing state in the related art, the embodiments of disclosure provides a method and device for call playback in a ringing state.

In one embodiment of the disclosure, a method for call playback in a ringing state is provided, which includes that: after forwarding, by an Access Transfer Control Functionality (ATCF), a call request initiated by a user terminal, and when receiving, by the ATCF, a first temporary response message returned by a called party, applying for, by the ATCF, a media resource for a first playback media and performing, by the ATCF, playback on the first playback media, wherein the first temporary response message carries description information about the first playback media; when receiving, by the ATCF, an nth temporary response message of the call request, reapplying for, by the ATCF, a pair of media resources to anchor an nth playback media, wherein the nth temporary response message carries description information about the nth playback media, and n is a natural number which is greater than or equal to 2; and performing, by the ATCF, playback on the nth playback media through the pair of media resource.

In an example embodiment, performing, by the ATCF, playback on the nth playback media through the pair of media resource includes: using, by the ATCF, the anchored nth playback media to perform updating and switching on an nth call remote media and updating, by the ATCF, a local anchored media after receiving an update response; and forwarding, by the ATCF, the received nth temporary response message to a Proxy Call Session Control Function (P-CSCF), wherein the forwarded nth temporary response message carries the anchored nth playback media.

In an example embodiment, after forwarding, by the ATCF, the received nth temporary response message to the P-CSCF, the method further includes: receiving, by the ATCF, an acknowledgement message, which is returned by the P-CSCF, corresponding to the nth temporary response message; and returning, by the ATCF, a response corresponding to the acknowledgement message to the P-CSCF.

In an example embodiment, performing, by the ATCF, playback on the nth playback media through the pair of media resource includes: forwarding, by the ATCF, the received nth temporary response message to the P-CSCF, wherein the forwarded nth temporary response message carries the anchored nth playback media; and using, by the ATCF, the anchored nth playback media to perform updating and switching on an nth call remote media and updating, by the ATCF, a local anchored media after receiving an update response.

In an example embodiment, after forwarding, by the ATCF, the received nth temporary response message to the P-CSCF, the method further includes: receiving, by the ATCF, an acknowledgement message, which is returned by the P-CSCF, corresponding to the nth temporary response message, and transparently passing, by the ATCF, the acknowledgement message to a Serving Call Session Control Function (S-CSCF); receiving, by the ATCF, a response, which is returned by the S-CSCF, corresponding to the acknowledgement message and transparently passing, by the ATCF, the response to the P-CSCF.

In an example embodiment, reapplying for, by the ATCF, a pair of media resources to the anchor the nth playback media includes: applying for, by the ATCF, a calling media resource for the nth playback media; and applying for, by the ATCF, a called media resource for the nth playback media.

In an example embodiment, after the called party answers and a call enters a call state, the method further includes: releasing, by the ATCF, all applied anchored media resources except an answer path, wherein the answer path is a path occupied by an answered call.

In another embodiment of the disclosure, a device for call playback in a ringing state is provided, which includes:

a first playback component, which is configured to, after forwarding a call request initiated by a user terminal, and when receiving a first temporary response message returned by a called party, apply for a media resource for a first playback media and perform playback on the first playback media, wherein the first temporary response message carries description information about the first playback media; an applying component, which is configured to, when receiving an nth temporary response message of the call request, reapply for a pair of media resources to anchor an nth playback media, wherein the nth temporary response message carries description information about the nth playback media, and n is a natural number which is greater than or equal to 2; and a second playback component, which is configured to perform playback on the nth playback media through the pair of media resource.

In an example embodiment, the second playback component includes: an updating component, which is configured to use the anchored nth playback media to perform updating and switching on an nth call remote media, and update a local anchored media after receiving an update response; and a forwarding component, which is configured to forward the received nth temporary response message to a Proxy Call Session Control Function (P-CSCF), wherein the forwarded nth temporary response message carries the anchored nth playback media.

In an example embodiment, further including: a releasing component, which is configured to, after the called party answers and a call enters a call state, release all applied anchored media resources except an answer path, wherein the answer path is a path occupied by an answered call.

By means of the disclosure, when multiple temporary response messages carrying the description information about the media are received in the ringing state, the anchored media resource is applied for each playback media, thereby implementing multi-path playback.

BRIEF DESCRIPTION OF THE DRAWINGS

The accompanying drawings described here are used for providing a deeper understanding of the disclosure, and constitute a part of the application; schematic embodiments of the disclosure and description thereof are used for illustrating the disclosure and not intended to form an improper limit to the disclosure. In the accompanying drawings.

DETAILED DESCRIPTION OF THE EMBODIMENTS

The disclosure is described below with reference to the accompanying drawings and embodiments in detail. It needs to be noted that the embodiments of the disclosure and the characteristics in the embodiments can be combined under the condition of no conflicts.

According to an embodiment of the disclosure, a method for call playback in a ringing state is provided.

Figure 2:
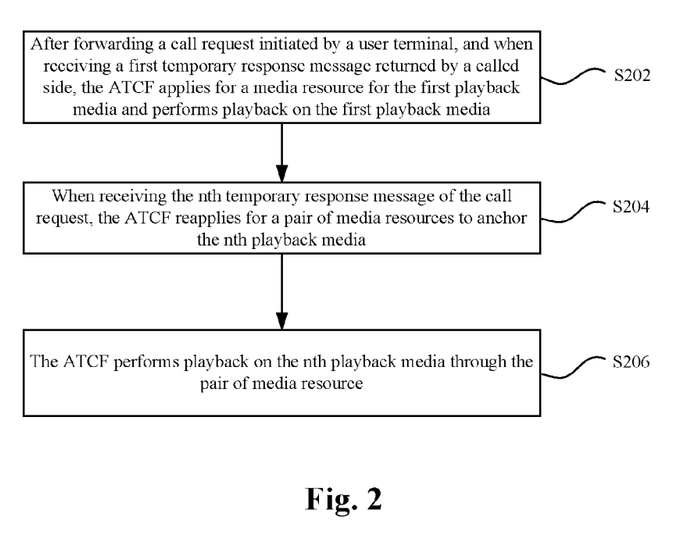
FIG. 2 is a flowchart of a method for call playback in a ringing state according to an embodiment of the disclosure.

FIG. 2 is a flowchart of a method for call playback in a ringing state according to an embodiment of the disclosure. As shown in FIG. 2, the flow mainly includes the following steps (Step 202-Step 206).

Step 202: after forwarding a call request initiated by a user terminal, and when receiving a first temporary response message returned by a called side, the ATCF applies for a media resource for the first playback media and performs playback on the first playback media, wherein the first temporary response message carries description information about the first playback media.

For example, in the system shown in FIG. 1, the user terminal initiates a call through the P-CSCF; in a situation where anchoring the media is supported, the ATCF forwards the call request to the S-CSCF, wherein the call request carries an anchored ATGW media. And then the ATCF receives the temporary response message which carries the playback media, and updates the anchored media. After that, the ATCF forwards the temporary response message (carrying the anchored ATGW media) to the P-CSCF to implement the playback of a first call.

Optionally, in an example embodiment of the disclosure, the temporary response message can be a 18x response message. A tag field in a To header of a first 18x response message of the call request received by the ATCF is to-tag1, which identifies the first call.

Step 204: when receiving an nth temporary response message of the call request, the ATCF reapplies for a pair of media resources to anchor an nth playback media, wherein the nth temporary response message carries description information about the nth playback media, and n is a natural number which is greater than or equal to 2.

For example, if the ATCF receives a second 18x response message (to-tag2) which carries the playback media, the ATCF confirms that a Forked call happens and reapplies for the media resource to anchor a second playback media.

Step 206: the ATCF performs playback on the nth playback media through the pair of media resource.

In this step, the ATCF performs two processes. A first process is updating the media, and a second process is forwarding the received temporary response message to the P-CSCF. In the specific implementation process, it is feasible to perform the first process and then perform the second process. Or, it is feasible to perform the second process and then perform the first process. So, Step 206 may have two implementation modes.

The first implementation mode is performing the first process and then performing the second process, so Step 206 may include:

Step 1: the ATCF uses the anchored nth playback media to perform updating and switching on an nth call remote media, and updates a local anchored media after receiving an update response; and Step 2: the ATCF forwards the received nth temporary response message to the P-CSCF, wherein the forwarded nth temporary response message carries the anchored nth playback media.

Optionally, in such an implementation mode, after the ATCF forwards the received nth temporary response message to the P-CSCF, the method further includes that: the ATCF receives the acknowledgement message, which is returned by the P-CSCF, corresponding to the nth temporary response message; and the ATCF returns a response corresponding to the acknowledgement message to the P-CSCF. That is, the ATCF replies the acknowledgement message corresponding to the temporary response message sent by the P-CSCF.

The second implementation mode is performing the second process and then performing the first process, so Step 206 may include:

Step 1: the ATCF forwards the received nth temporary response message to the P-CSCF, wherein the forwarded nth temporary response message carries the anchored nth playback media.

Step 2: the ATCF uses the anchored nth playback media to perform updating and switching on the nth call remote media, and updates the local anchored media after receiving the update response.

In such an implementation mode, after the ATCF forwards the received nth temporary response message to the P-CSCF, the method further includes that: the ATCF receives the acknowledgement message, which is returned by the P-CSCF, corresponding to the nth temporary response message and transparently passes the acknowledgement message to the SCSCF; and the ATCF receives the response, which is returned by the SCSCF, corresponding to the acknowledgement message and transparently passes the response to the P-CSCF. That is, the ATCF transparently passes the acknowledgement message corresponding to the temporary response message.

In the specific implementation process, the acknowledgement message corresponding to the temporary response message can be a PRACK message.

Optionally, in an example embodiment of the disclosure, in Step 204, a pair of media resources that the ATCF reapplies for include a calling media resource and a called media resource.

For utilizing the resource effectively, optionally, after the called side answers and the call enters the call state, the method further includes that: the ATCF releases all applied anchored media resources except an answer path, wherein the answer path is a path occupied by an answered call. That is, the ATCF releases the anchored media resources of other paths except the path for answering in the pair of n+1 media resources.

Embodiment 1

Figure 3:
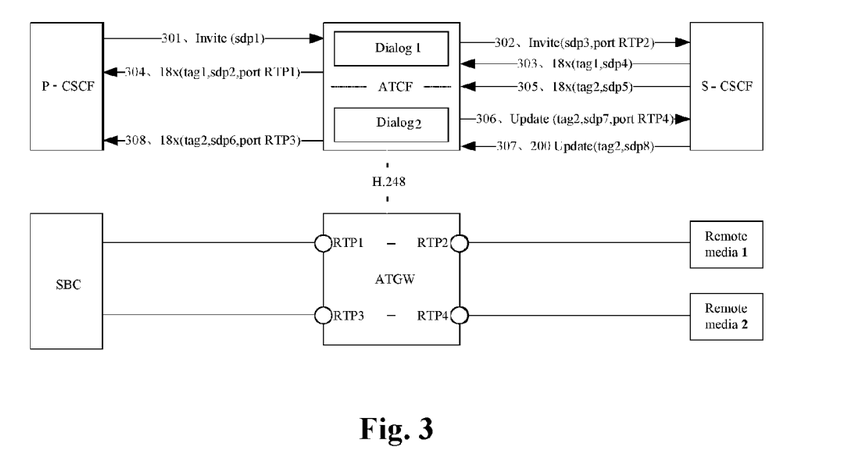
FIG. 3 is a schematic diagram of an SIP signalling flow and media anchoring in a scenario where playbacks of multiple Forked calls in a ringing state is performed according to a first embodiment of the disclosure.

In the present embodiment, in a scenario where the playbacks of multiple Forked calls in a ringing state are performed, the ATCF anchors multiple playback media resources. The anchored ATGW media is shown in FIG. 3. FIG. 3 shows a scenario where the playbacks of two Forked calls are performed simultaneously, and a situation where the playbacks of more calls (N calls) are performed simultaneously can be deduced according to the scenario where the playbacks of two Forked calls are performed simultaneously. The ATCF implements playback by anchoring multiple (N) media resources.

FIG. 3 is a schematic diagram of an SIP signalling flow and media anchoring in a scenario where the playbacks of multiple Forked calls in a ringing state are performed according to the present embodiment. As shown in FIG. 3, the implementation of the present embodiment may include Step 301 to Step 308.

Step 301: the user terminal initiates a call through the P-CSCF; the P-CSCF sends an invite message to the ATCF, wherein the invite message carries description information about a media sdp1.

Step 302: in a situation where anchoring the media is supported, the ATCF forwards the call request (the invite message) to the S-CSCF, wherein the call request carries an anchored ATGW media (sdp3).

Step 303: the ATCF receives a first 18× response message (to-tag1) which carries a playback media (sdp4), and updates the anchored media.

Step 304: the ATCF forwards the 18× response message (to-tag1) (carrying the anchored ATGW media, namely sdp2) to the P-CSCF to implement the playback of the first call.

Step 305: if the ATCF receives a second 18× response message (to-tag2) which carries a playback media (sdp5), the ATCF considers that the Forked call happens and reapplies for the media resource (RTP4) to anchor a second media.

Step 306: the ATCF uses an anchored second ATGW media (sdp7) to perform update media switching on a remote end.

Step 307: after receiving an update 200 response, the ATCF updates the local anchored media.

Step 308: the ATCF forwards the 18× response message (to-tag2) (carrying the anchored second ATGW media) to the P-CSCF to implement the playback of the second call.

In the method provided by the present embodiment, when the ATCF has the Forked call, if the 18× response (which is not the first response) carrying the information about the media of a Forked sub-call at the called side is received in the ringing state, a pair of ATGW media resources are created for the sub-path to anchor the media, so as to implement the simultaneous media playbacks of multiple calls.

In the present embodiment, if the ATCF receives the second 18× response message (to-tag2) which carries the playback media, the ATCF applies for a new media resource to anchor the second media. After that, the ATCF needs to forward the 18× response message (to-tag2) (carrying the anchored second ATGW media) to the P-CSCF, and uses the anchored second ATGW media to perform the update media switching to the remote end. The sequence of the two operations is random. In the present embodiment, it is feasible for the ATCF to forward the 18× response message (to-tag2) and then perform the update media switching to the remote end, or perform the update media switching to the remote end and then forward the 18× response message (to-tag2).

Embodiment 2

Figure 4:
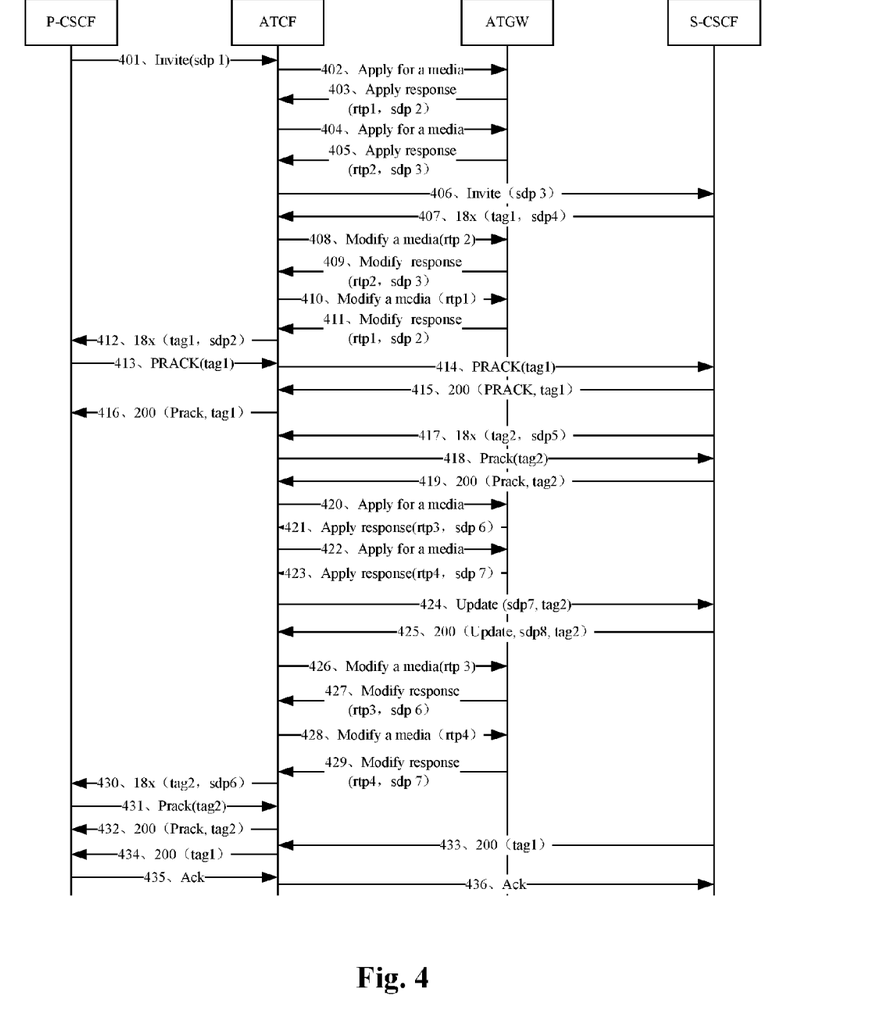
FIG. 4 is a signalling flowchart of multi-path playback in a ringing state according to a second embodiment of the disclosure.

FIG. 4 is a signalling flowchart of the present embodiment. As shown in FIG. 4, implementing the playbacks of multiple calls in the ringing state mainly includes Step 401 to Step 436.

Step 401: a calling user initiates a call request, and then the P-CSCF sends an invite message to the ATCF, wherein the invite message carries information of a media sdp1.

Step 402 to Step 403: the ATCF applies for an ATGW media resource for a calling media, and then the ATGW returns a media resource RTP1; the corresponding local sdp media is sdp2.

Step 404 to Step 405: the ATCF applies for the ATGW media resource for a called media, and then the ATGW returns media resource RTP2; a corresponding local sdp media is sdp3.

Step 406: the ATCF forwards the call request to the S-CSCF, wherein the call request carries the information about the media sdp3.

Step 407: the ATCF receives a first 18× response message (to-tag1) which carries the information about a media sdp4.

Step 408 to Step 409: the ATCF updates information about an ATGW RTP2 remote media to the sdp4.

Step 410 to Step 411: the ATCF updates information about the ATGW RTP1 remote media to a selected media (which is selected by the ATCF through negotiation) after the sdp1 and the sdp4 negotiate.

Step 412: the ATCF forwards an 18× (to-tag1) response which carries the information about the media sdp2.

Step 413 to Step 416: the 18× (tag1) message passes a PRACK acknowledgement.

Step 417: the ATCF receives a second 18× response message (to-tag2) which carries information about a media sdp5.

Step 418 to Step 419: the ATCF directly returns a PRACK acknowledgement to the second response message (to-tag2).

Step 420 to Step 421: the ATCF applies for the ATGW media resource for the calling media of the second call (to-tag2), and then the ATGW returns the media resource RTP3; a corresponding local sdp media is sdp6.

Step 422 to Step 423: the ATCF applies for the ATGW media resource for the called media, and then the ATGW returns a media resource RTP4; a corresponding local sdp media is sdp7.

Step 424: the ATCF sends an update request to switch the second call (to-tag2) remote media, wherein the update request carries the information about the media sdp7.

Step 425: the ATCF receives the 200 response corresponding to the update request of the second call (to-tag2), wherein the 200 response carries information about a media sdp8.

Step 426 to Step 427: the ATCF updates the information about an ATGW RTP4 remote media to sdp8.

Step 428 to Step 429: the ATCF updates information about an ATGW RTP3 remote media to a selected media (which is selected by the ATCF through negotiation) after the sdp1 and the sdp8 negotiate.

Step 430: the ATCF forwards an 18× (to-tag2) response which carries the information about the media sdp6.

Step 431 to Step 432: the P-CSCF returns the PRACK acknowledgement to the 18× (to-tag2) response; the ATCF directly returns a PRACK 200 response. Now, the ATCF has performed the playbacks of multiple Forked calls in the ringing state through a 18× response media.

Step 433 to Step 436: the called side answers the (to-tag1) and then enters the call state. After entering the call state, the ATCF should take the initiative to release the anchored media resources related to the to-tag2, namely the media resources RTP3 and RTP4.

Embodiment 3

Figure 5:
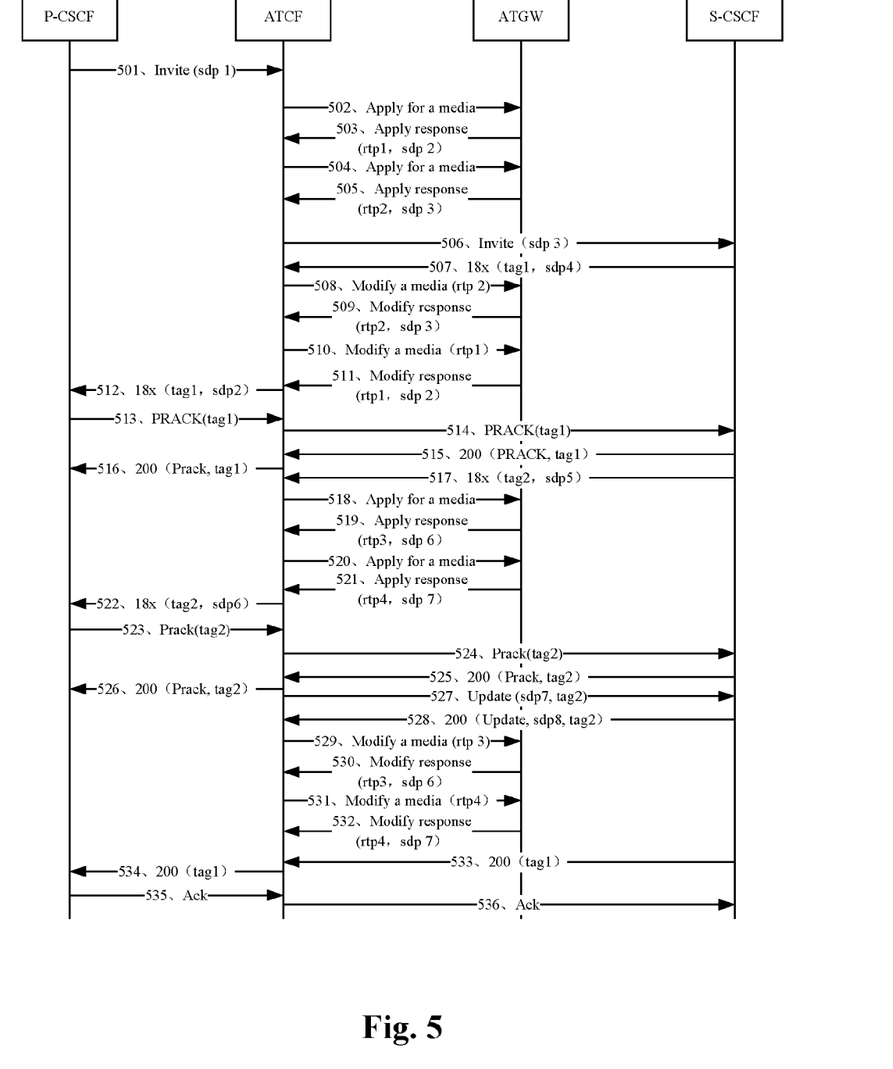
FIG. 5 is a signalling flowchart of multi-path playback in a ringing state according to a third embodiment of the disclosure.

FIG. 5 is a signalling flowchart of the present embodiment. As shown in FIG. 5, implementing the playbacks of multiple calls in the ringing state mainly includes Step 501 to Step 536.

Steps 501 to 517 are the same as the steps 401 to 417.

Step 518 to Step 519: the ATCF applies for an ATGW media resource for a calling media of a second call (to-tag2), and then an ATGW returns a media resource RTP3; a corresponding local sdp media is sdp6.

Step 520 to Step 521: the ATCF applies for the ATGW media resource for the called media of the second call (to-tag2), and then the ATGW returns a media resource RTP4; a corresponding local sdp media is sdp7.

Step 522: the ATCF forwards the 18× (to-tag2) response which carries the information about the media sdp6.

Step 523 to Step 526: an 18× (tag2) message passes the PRACK acknowledgement. Unlike the embodiment 2, the ATCF transparently passes the PRACK and a response corresponding to the PRACK, but not replies a PRACK response.

Step 527: the ATCF sends the update request to switch the remote media of the second call (to-tag2), wherein the update request carries the information about the media sdp7.

Step 528: the ATCF receives the 200 response corresponding to the update request of the second call (to-tag2), wherein the 200 response carries information about a media sdp8.

Step 529 to Step 530: the ATCF updates information about an ATGW RTP4 remote media to sdp8.

Step 531 to Step 532: the ATCF updates the information about the ATGW RTP3 remote media to the selected media (which is selected by the ATCF through negotiation) after the sdp1 and the sdp8 negotiate. Now, the ATCF has performed the playbacks of multiple Forked calls in the ringing state through the 18× response media.

Step 533 to Step 536: the called side answers the (to-tag2) and then enters the call state. After entering the call state, the ATCF should take the initiative to release the anchored media resources related to the to-tag2, namely the media resources RTP3 and RTP4.

According to another embodiment of the disclosure, a device for call playback in a ringing state is also provided, which can be applied to implementing the method for call playback in the ringing state provided in each embodiment.

Figure 6:
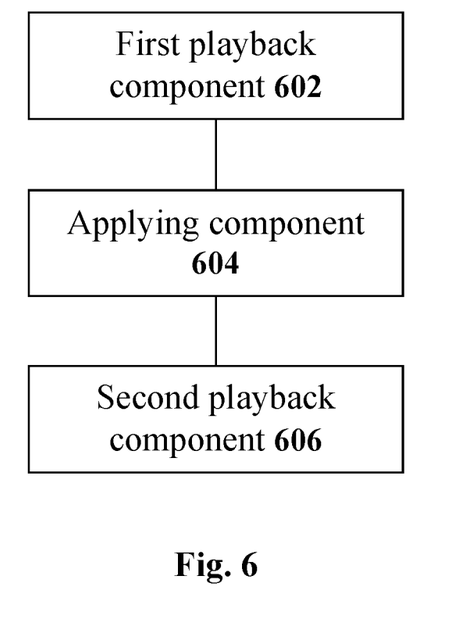
FIG. 6 is a structural schematic diagram of a device for multi-path playback in a ringing state according to an embodiment of the disclosure.

FIG. 6 is a structural schematic diagram of a device for multi-call playback in a ringing state according to an embodiment of the disclosure. As shown in FIG. 6, the device may include: a first playback component 602, an applying component 604 and a second playback component 606. It should be understood that a connection relation of components shown in FIG. 6 is only an example. Those skilled in the art can adopt other connection relations, as long as these components in such as connection relation can also implement functions of the disclosure.

In this specification, the function of each component can be implemented by using dedicated hardware or hardware that can perform processing in combination with appropriate software. Such hardware or dedicated hardware may include an Application-Specific Integrated Circuit (ASIC), various other circuits, and various processors. When being implemented by a processor, the function can be provided by a single dedicated processor, a single shared processor, or multiple independent processors (some of which may be shared). In addition, the processor should not be interpreted as the hardware capable of executing software, but may implicitly include but not limited to, a Digital Signal Processor (DSP), a Read-Only Memory (ROM), a Random Access Memory (RAM), and a non-volatile memory device.

The device provided in the disclosure can be set in the ATCF; or, the function of the device can be implemented by interacting with the ATCF.

The first playback component 602 is configured to, after forwarding a call request initiated by an user terminal, and when receiving a first temporary response message returned by a called side, apply for a media resource for a first playback media and perform playback on the first playback media, wherein the first temporary response message carries description information about a first playback media;

the applying component 604 is configured to, when receiving an nth temporary response message of the call request, reapply for a pair of media resources to anchor an nth playback media, wherein the nth temporary response message carries description information about the nth playback media, and n is a natural number which is greater than or equal to 2; and The second playback component 606 is configured to perform playback on the nth playback media through the pair of media resource.

Optionally, the second playback component 606 may include an updating component which is configured to use the anchored nth playback media to update and switch the nth call remote media and update the local anchored media after receiving the update response, and a forwarding component which is configured to forward the received nth temporary response message to the P-CSCF, wherein the forwarded nth temporary response message carries the anchored nth playback media. In the specific implementation process, the updating component and the forwarding component can update the media and forward the temporary response message according to the method described in the embodiment 3 and embodiment 4, which will not be repeated here.

Optionally, the device further includes: a releasing component, which is configured to, after the called side answers and a call enters the call state, release all applied anchored media resources except the answer path, wherein the answer path is the path occupied by the answered call. That is, the releasing component releases the anchored media resources of other paths except the path for answering in the pair of n+1 media resources.

It can be seen from the description above that by means of the technical solution provided by the embodiment 1, when receiving multiple temporary response messages carrying the description information about the media in the ringing state, the ATCF applies for the anchored media resource for each playback media, thereby implementing the playbacks of multiple calls.

INDUSTRIAL APPLICABILITY

In the embodiments of the disclosure, when multiple temporary response messages carrying description information about a media are received in a ringing state, an anchored media resource is applied for each playback media, thereby implementing the playbacks of multiple calls. The disclosure has an industrial applicability.

What is claimed is:

1. A method for call playback in a ringing state, comprising:
after forwarding, by an Access Transfer Control Functionality (ATCF), a call request initiated by a user terminal, and when receiving, by the ATCF, a first temporary response message returned by a called party, applying for, by the ATCF, a media resource for a first playback media and performing, by the ATCF, playback on the first playback media, wherein the first temporary response message carries description information about the first playback media;
when receiving, by the ATCF, an nth temporary response message of the call request, reapplying for, by the ATCF, a pair of media resources to anchor an nth playback media, wherein the nth temporary response message carries description information about the nth playback media, and n is a natural number which is greater than or equal to 2; and
performing, by the ATCF, playback on the nth playback media through the pair of media resource.

2. The method as claimed in claim 1, wherein performing, by the ATCF, playback on the nth playback media through the pair of media resource comprises:
using, by the ATCF, the anchored nth playback media to perform updating and switching on an nth call remote media and updating, by the ATCF, a local anchored media after receiving an update response; and
forwarding, by the ATCF, the received nth temporary response message to a Proxy Call Session Control Function (P-CSCF), wherein the forwarded nth temporary response message carries the anchored nth playback media.

3. The method as claimed in claim 2, wherein after forwarding, by the ATCF, the received nth temporary response message to the P-CSCF, the method further comprises:
receiving, by the ATCF, an acknowledgement message, which is returned by the P-CSCF, corresponding to the nth temporary response message; and
returning, by the ATCF, a response corresponding to the acknowledgement message to the P-CSCF.

4. The method as claimed in claim 1, wherein performing, by the ATCF, playback on the nth playback media through the pair of media resource comprises:
forwarding, by the ATCF, the received nth temporary response message to the P-CSCF, wherein the forwarded nth temporary response message carries the anchored nth playback media; and
using, by the ATCF, the anchored nth playback media to perform updating and switching on an nth call remote media and updating, by the ATCF, a local anchored media after receiving an update response.

5. The method as claimed in claim 4, wherein after forwarding, by the ATCF, the received nth temporary response message to the P-CSCF, the method further comprises:
receiving, by the ATCF, an acknowledgement message, which is returned by the P-CSCF, corresponding to the nth temporary response message, and transparently passing, by the ATCF, the acknowledgement message to a Serving Call Session Control Function (S-CSCF);
receiving, by the ATCF, a response, which is returned by the S-CSCF, corresponding to the acknowledgement message and transparently passing, by the ATCF, the response to the P-CSCF.

6. The method as claimed in claim 1, wherein reapplying for, by the ATCF, a pair of media resources to the anchor the nth playback media comprises:
applying for, by the ATCF, a calling media resource for the nth playback media; and
applying for, by the ATCF, a called media resource for the nth playback media.

7. The method as claimed in claim 1, wherein after the called party answers and a call enters a call state, the method further comprises:
releasing, by the ATCF, all applied anchored media resources except an answer path, wherein the answer path is a path occupied by an answered call.

8. A device for call playback in a ringing state, comprising:

a first playback component, which is configured to, after forwarding a call request initiated by a user terminal, and when receiving a first temporary response message returned by a called party, apply for a media resource for a first playback media and perform playback on the first playback media, wherein the first temporary response message carries description information about the first playback media;

an applying component, which is configured to, when receiving an nth temporary response message of the call request, reapply for a pair of media resources to anchor an nth playback media, wherein the nth temporary response message carries description information about the nth playback media, and n is a natural number which is greater than or equal to 2; and a second playback component, which is configured to perform playback on the nth playback media through the pair of media resource.

9. The device as claimed in claim 8, wherein the second playback component comprises:

an updating component, which is configured to use the anchored nth playback media to perform updating and switching on an nth call remote media, and update a local anchored media after receiving an update response; and a forwarding component, which is configured to forward the received nth temporary response message to a Proxy Call Session Control Function (P-CSCF), wherein the forwarded nth temporary response message carries the anchored nth playback media.

10. The device as claimed in claim 8, further comprising:
a releasing component, which is configured to, after the called party answers and a call enters a call state, release all applied anchored media resources except an answer path, wherein the answer path is a path occupied by an answered call.

11. The method as claimed in claim 2, wherein reapplying for, by the ATCF, a pair of media resources to the anchor the nth playback media comprises:

applying for, by the ATCF, a calling media resource for the nth playback media; and applying for, by the ATCF, a called media resource for the nth playback media.

12. The method as claimed in claim 3, wherein reapplying for, by the ATCF, a pair of media resources to the anchor the nth playback media comprises:

applying for, by the ATCF, a calling media resource for the nth playback media; and applying for, by the ATCF, a called media resource for the nth playback media.

13. The method as claimed in claim 4, wherein reapplying for, by the ATCF, a pair of media resources to the anchor the nth playback media comprises:

applying for, by the ATCF, a calling media resource for the nth playback media; and applying for, by the ATCF, a called media resource for the nth playback media.

14. The method as claimed in claim 5, wherein reapplying for, by the ATCF, a pair of media resources to the anchor the nth playback media comprises:

applying for, by the ATCF, a calling media resource for the nth playback media; and applying for, by the ATCF, a called media resource for the nth playback media.

15. The method as claimed in claim 2, wherein after the called party answers and a call enters a call state, the method further comprises:

releasing, by the ATCF, all applied anchored media resources except an answer path, wherein the answer path is a path occupied by an answered call.

16. The method as claimed in claim 3, wherein after the called party answers and a call enters a call state, the method further comprises:

releasing, by the ATCF, all applied anchored media resources except an answer path, wherein the answer path is a path occupied by an answered call.

17. The method as claimed in claim 4, wherein after the called party answers and a call enters a call state, the method further comprises:

releasing, by the ATCF, all applied anchored media resources except an answer path, wherein the answer path is a path occupied by an answered call.

18. The method as claimed in claim 5, wherein after the called party answers and a call enters a call state, the method further comprises:

releasing, by the ATCF, all applied anchored media resources except an answer path, wherein the answer path is a path occupied by an answered call.

19. The device as claimed in claim 9, further comprising:
a releasing component, which is configured to, after the called party answers and a call enters a call state, release all applied anchored media resources except an answer path, wherein the answer path is a path occupied by an answered call.

* * * * *